United States Patent
Kurowski et al.

(10) Patent No.: US 12,057,027 B2
(45) Date of Patent: Aug. 6, 2024

(54) DEVICE FOR GENERATING COMPUTER PROGRAMS AND A METHOD FOR GENERATING COMPUTER PROGRAMS

(71) Applicants: Krzysztof Kurowski, Poznan (PL); Bogdan Ludwiczak, Poznan (PL); Radoslaw Golebiewski, Poznan (PL); Marcin Michalski, Poznan (PL); Zbigniew Karwasinski, Wrzesnia (PL); Michal Dziedziniewicz, Poznan (PL); Lukasz Malinowski, Oborniki (PL)

(72) Inventors: Krzysztof Kurowski, Poznan (PL); Bogdan Ludwiczak, Poznan (PL); Radoslaw Golebiewski, Poznan (PL); Marcin Michalski, Poznan (PL); Zbigniew Karwasinski, Wrzesnia (PL); Michal Dziedziniewicz, Poznan (PL); Lukasz Malinowski, Oborniki (PL)

(73) Assignee: BECREO TECHNOLOGIES SP. Z O. O., Poznan (PL)

(*) Notice: Subject to any disclaimer, the term of this patent is extended or adjusted under 35 U.S.C. 154(b) by 1315 days.

(21) Appl. No.: 16/313,176

(22) PCT Filed: Jul. 6, 2017

(86) PCT No.: PCT/EP2017/066920
§ 371 (c)(1),
(2) Date: Dec. 26, 2018

(87) PCT Pub. No.: WO2018/007515
PCT Pub. Date: Jan. 11, 2018

(65) Prior Publication Data
US 2019/0156698 A1 May 23, 2019

(30) Foreign Application Priority Data
Jul. 6, 2016 (PL) .......................... 417869

(51) Int. Cl.
*G09B 19/24* (2006.01)
*G06F 8/34* (2018.01)
(Continued)

(52) U.S. Cl.
CPC .......... *G09B 19/0053* (2013.01); *G06F 8/34* (2013.01); *G06V 20/64* (2022.01); *G09B 1/36* (2013.01); *G09B 23/186* (2013.01)

(58) Field of Classification Search
CPC ...... G09B 23/283; G09B 19/24; A61C 19/00; A61C 19/04; A61C 17/00; A61C 17/18;
(Continued)

(56) References Cited

PUBLICATIONS

Michael S. Horn, et al: "Tangible programming and informal science learning", Interaction Design and Children, ACM, 2 Penn Plaza, Suite 701 New York, NY USA, Jun. 11, 2008, pp. 194-201, XP058315146.
(Continued)

*Primary Examiner* — Kesha Frisby
(74) *Attorney, Agent, or Firm* — Rivka Friedman (57) ABSTRACT

A system for generating computer programs includes physical carriers of information that have a rectangular contrasting marker associated with an element of the computer program and a description text and/or a graphical symbol. The carriers may form the computer program when they are sequentially arranged along a first axis and at least one carrier may receive another carrier of information on its right side, along a second axis. The system also includes image capturing device for capturing a digital image of an arrangement of the carriers forming the computer program. A computer device has a display screen and is configured to process the image; recognize the carriers on the image; determine the arrangement of the carriers with respect to each other; superimpose on the image a graphical icon above the marker of each recognized carrier; output the combined
(Continued)

digital image and convert the determined arrangement to the computer program.

10 Claims, 7 Drawing Sheets (51) Int. Cl.
　　*G06V 20/64*　　(2022.01)
　　*G09B 1/36*　　(2006.01)
　　*G09B 19/00*　　(2006.01)
　　*G09B 23/18*　　(2006.01)

(58) Field of Classification Search
　　CPC ....... A61C 5/40; A61B 5/0088; A61B 5/0007; A61B 5/00
　　USPC .......................................................... 434/263
　　See application file for complete search history.

(56) References Cited

PUBLICATIONS

Michael S. Horn et al: "Designing tangible programming languages for classroom use",. Tangible and Embedded Interaction Archive Proceedings of Teh 1st International Conference on Tangible and Embedded Interaction, ACM, New York, NY, USA, Feb. 15, 2007, pp. 159-162, XPO58184868.

Kazuki Tada et al: "Tangible Programming Environment Using Paper Cards as Command Objects", Procedia Manufacturing, vol. 3, 2015, pp. 5482-5489, XP055407675.

Gallardo D. et al: "Turtan: A tangible programming language for creative exploration", Horizontal Interactive Human Computer Systems, 2008. Tabletop 2008. 3rd IEEE International Workshop on, IEEE, Piscataway, NJ, USA, 2008, pp. 89-92, XPO31397797.

DEVICE FOR GENERATING COMPUTER PROGRAMS AND A METHOD FOR GENERATING COMPUTER PROGRAMS

TECHNICAL FIELD

The present invention relates to a device for generating computer programs, using a tangible user interface (TUI) as well as a method for generating computer programs. The present invention is applicable in particular to learning of programming by children and youths.

BACKGROUND

A user interface (UI), understood as a part of a device or software responsible for interaction with a user, is nowadays largely based on operating a pointing device, a cursor of which is displayed on a display screen. Graphical user interfaces (GUIs) of such type are dominant in consumer devices. Touch user interfaces gain popularity, wherein control of a computer is effected by a contact of a user body (typically, a finger) with a touchpad or a touchscreen, in which there is combined a function of an input device and an output device. However, interfaces for programming computers or other devices are still dominated by command line interface (CLI), wherein commands are entered to the computer using a keyboard, as a sequence of text lines.

However, a natural way of acting, for a human, is to use physical objects. Manipulating objects only generated on a display screen of a device, as well as entering textual commands, are not natural for humans. Therefore, there is a high potential in tangible user interfaces (TUIs) that are based on manipulating physical objects (physical carriers of information) in order to control operation of a computer. Such interfaces may be also used in computer programming.

A U.S. Pat. No. 6,175,954 discloses a device for generating computer programs, comprising physical carriers of information, an image capturing device as well as a computer device, processing signal from the image capturing device. It does address a problem of technical transfer, to the computer device, of information regarding position and configuration of the physical carriers of information.

A PCT patent application WO2015/197691 discloses a method for data input that may find its use also in generating computer programs. In this method there have been used physical carriers of information, a measuring device (which may also be an image capturing device) and computer devices, wherein based on data regarding position and configuration of the physical carriers of information, there are generated input data for a computer program. The described method is based on assigning, in a computer device, a function (which may be a part of an algorithm) to respective physical carriers of information and subsequently generating, in the computer device, input data for a computer program based on data retrieved by the measuring device.

A special role of TUIs is related to kindergarten and early school stage of learning of computer science, where manual and perception skills of students are limited. In such cases, a use of physical interface elements significantly eases work with children and allows for effectively catching their attention by making data input similar to a game or a play.

Some known devices use physical blocks (physical carriers of information) for learning computer programming, to which there have been assigned, in the computer, elements of a computer algorithm. A user creates a complete algorithm by putting together the blocks. The algorithm may be executed on a computer or a mobile device such as a tablet or a smartphone. A technical problem associated with these systems is how to guarantee a precise and error-free method for transferring, to the computer device, information regarding mutual position and configuration of the physical blocks (the physical carriers of information).

A US patent application US2016/0112279 presents a separate blocks which are equipped with electronic elements. This concept is utilized in a project "Project bloks" by Google, Stanford University and IDEO. The blocks are connected together and communicate with each other as well as with a control module in order to transfer information regarding their mutual position and configuration.

Another project, "Osmo coding" by Tangible Play, Inc., comprises blocks constituting physical carriers of information that are devoid of electronic elements. Their recognition is effected by a photographic add-on for a camera of a tablet (placed on a special pad for fixing the setup), based on shape and colour analysis of a physical block. The blocks comprise graphical symbols, legible to a human being, owing to which a user may intuitively build algorithms, with the block, which may subsequently be executed by a tablet. Such recognition scheme is also disclosed in a U.S. Pat. No. 9,354,716 (Sharma et al.) is based on analogous scheme of recognition of position and configuration of physical blocks (physical carriers of information), wherein there is disclosed a system for visualizing physical, user interface objects on a computer display screen, which may also be used as a device for generating computer programs. The system comprises physical carriers of information, an image capturing device for as well as a computer device processing signal from the image capturing device. The system operates according to the following method: physical carriers of information are arranged on a working space; next, with a use of the image capturing device, there is recorded an arrangement of the physical carriers of information on a plane and an image, captured by the image capturing device, is transferred to the computer device where data regarding mutual position, configuration, shape and colour of the physical carriers of information are converted to data legible to the computer device. The arrangement of the physical carriers of information is recognised based on shape and colour analysis of the physical carriers of information.

A U.S. Pat. No. 6,366,300 discloses a visual programming method and a system wherein an object selection means is used for selecting a behavioral graphical object defining the behavior of a load connected thereto, a behavior selection means is used for selecting the type of the behavior of the behavioral graphical object, a relevant object selection means is used for selecting relevant graphical objects related to the behavior of the behavioral graphical object and a behavioral rule setting means is used for setting behavioral rules of the behavioral graphical object.

A Chinese patent application CN102136208 discloses a material object programming method and system. The method comprises the steps of: establishing a set of material object programming display environment; shooting the sequence of material object programming blocks which are placed by a user and uploading the shot image to a material object programming processing module by using an image acquisition unit; converting the sequence of the material object blocks into a corresponding functional semantic sequence by using the material object programming processing module according to the computer vision identification modes and the position information of the material object programming blocks; determining whether the current functional semantic sequence meets the grammatical and semantic rules of the material object display environment or not, and if the current functional semantic sequence does not meet the grammatical and semantic rules of the material object display environment, feeding back a corresponding error prompt; replacing the corresponding material object programming blocks by using the user according to the prompt information; and repeating the steps until the functional semantic sequence corresponding to the sequence of the placed material object programming blocks meets the grammatical and semantic rules of the material object display environment, and finishing a programming task.

SUMMARY

A device, for generating computer programs, according to the present invention comprises also physical carriers of information, on which there is present a description text in a natural language and/or a graphical symbol legible to a human. The physical carrier of information may be any spatially defined object. The physical carrier of information may also be defined as a physical equivalent of a computer icon (a phicon or a physical icon).

An element of the device, for generating computer programs, is also an image capturing device as well as a computer device processing signal from the image capturing device—preferably both devices are integrated within a single device, for example a tablet or a smartphone.

In the computer device there is assigned, to each physical carrier of information, an element of computer program. Such element may, in particular, be a definition of a value, a variable of any kind, a function, a part of a function, an operator, a table, a programming library, an object, a class, a method, a command, an instruction as well as any type of any data. The assignment of an element of an algorithm to a physical carrier of information may be effected at any stage of using the device—before its sale (by a manufacturer) but also during its use (by a user).

A term of a computer device covers any device or electronic machine meant for information processing. It may inn particular be a personal computer, a tablet, a smartphone, an industrial robot or an intelligent domestic appliance.

The term of an image capturing device covers in particular a digital photo camera or a video camera—also those built-in a computer monitor or a tablet or a smartphone.

The device according to the present invention is characterised in that physical carriers of information comprise thereon a marker of a high contrast, the marker having preferably a rectangular, preferably a square shape.

The marker allows for a precise recognition of the physical carrier of information. It is possible, since an identifier is assigned to a physical carrier of information, which may be decoded by an analysis of bright and dark areas of the marker, which in turn have been assigned logical values.

A use of a rectangular marker allows also for processing of data, from the image capturing device, in order to correct perspective due to the fact that the image capturing device is not always parallel to a plane, on which the physical carriers of information have been arranged.

In order to execute such perspective correction, there is used information on location of vertices of a rectangle forming an outline of a marker. A use of a square shape, as a preferred feature, simplifies determination, using computer vision, whether a given element is a marker or not.

Preferably, physical carriers of information comprise at least one connecting zone, extending on the perimeter, in a form of a recess or a protrusion. The recess and/or protrusion can be at opposite sides of the carriers. The carriers may be adapted in shape to a particular language of the user, e.g. adapted to language in which the text is read from the left to the right, or to a language wherein the text is read from the right to the left, or from the top to the bottom. A connecting zone configured in such a manner allows for precise mutual positioning of the physical carriers of information.

Preferably, the high contrast marker is positioned outside a symmetry axis of the physical carrier of information. This feature simplifies orientation determination of the physical carrier of information.

A method, for generating computer programs, according to the present invention is based on cooperation of elements of the device, for generating computer programs, according to the present invention, i.e.:

physical carriers of information, on which there is positioned a description in a natural language and/or a graphical symbol legible to a human, an image capturing device and a computer device, in which there is assigned, to each physical carrier of information, an element of computer program, wherein the computer device is configured to process an image signal from the image capturing device.

The method comprises the following steps:

arranging the physical carriers of information on a plane;

capturing an image of the arrangement of the physical carriers of information by the image capturing device;

transferring the captured image to the computer device;

creating a computer program, in the computer device, from an array of ordered identifiers of the physical carriers of information, based on a structure associating identified markers with selected actions.

The method is characterised in that on the physical carriers of information there is present a high contrast, rectangular marker, preferably a square marker (advantageously outside a symmetry axis of the physical carrier of information), and in that the computer device is configured to execute, before creating the algorithm, the following steps):

identification of the markers as well as coordinates of their vertices and subsequently;

transformation of the captured image in order to correct perspective based on data regarding the coordinates of vertices of the identified markers.

Use of rectangular, high contrast markers allows for precise recognition, and transmission to the computer device, of position and configuration of the physical carriers of information.

A high contrast marker may be easily detected, with computer vision techniques, while there are maximised differences between different markers. This means that the method and device, according to the present invention, may efficiently operate using devices with low-end hardware configuration. Such solution is not influenced by plane lighting (making it difficult to detect colours of physical carriers of information—in systems based on shape and colour recognition of physical carriers of information).

Such solution also does not require a fixed arrangement of the image capturing device with respect to the plane. In case of consumer device, in which the computer device and the image capturing device are integrated in a single device for example a tablet or a smartphone, it eliminates a requirement of use of a special pad for fixing the device as known for example from U.S. Pat. No. 9,354,716 (Sharma et al.) patent. Image capture may be executed at different positions and may cover planes of significant size.

The device according to the present invention is also cost-efficient with respect to manufacturing and easy to operate—in particular with respect to solutions using electronic blocks, production of which is more expensive and which require a power source such as disclosed in a patent application of US 2016/0112279 (Kalanithi et al.). The device according to the present invention may be commercialised in a form of a set of physical carriers of information made of cardboard (or alternatively other materials withstanding wear and tear typically associated with games for children) as well as a mobile software application available online.

BRIEF DESCRIPTION OF DRAWINGS

The object of the present invention is shown in a preferred embodiment on a drawing in which.

DETAILED DESCRIPTION

A device, for generating computer programs, according to the present invention is shown in a preferred embodiment in FIGS. 1-9. The device comprises physical carriers of information 2 having a form of flat cardboard blocks of puzzle pieces.

Figure 2:
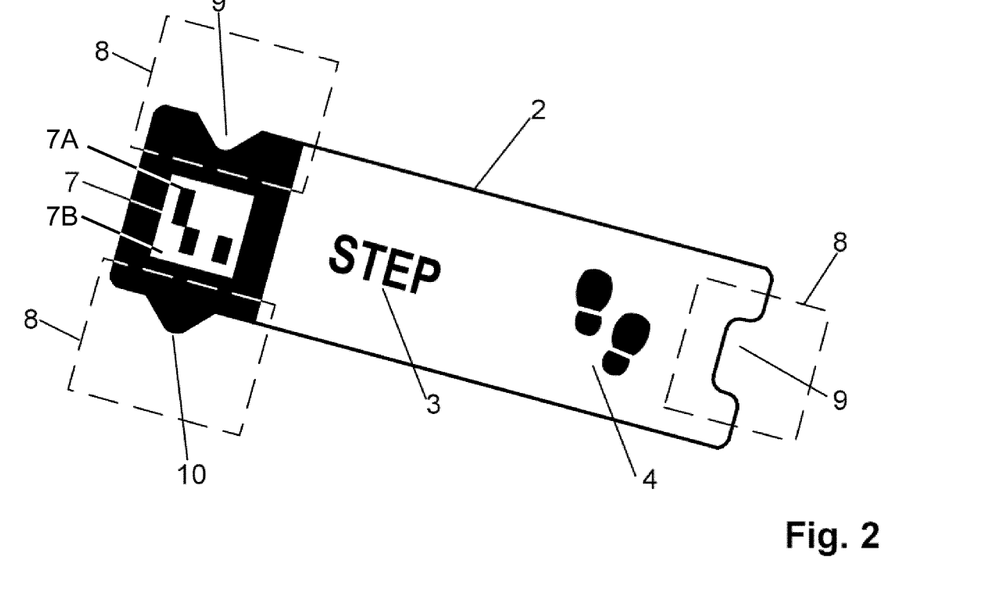
FIG. 2 presents construction details of a physical carrier of information in a form of a flat, cardboard block or puzzle piece.

On the physical carriers of information 2, there is a description text 3 in a natural language, such as Polish or English, and/or a graphical symbol 4 legible to a human, for example a shoe sole print (symbolising a step), arrows (symbolising rotations) or a question mark (symbolising a question or an if function).

On each carrier 2, preferably on its left side in a given distance from the left edge, there is positioned a contrasting rectangular marker 7, i.e. a marker comprising elements 7A, 7B in at least two contrasting colours—for example white and a different contrasting colour such as black, red, dark red, purple, green, blue or willow green. In other embodiments of the markers, more that two contrasting colours may be used to define the markers. The elements 7A, 7B of the marker 7 preferably form a matrix barcode, i.e. a 2-dimensional array of elements that create specific patterns.

The marker 7 is preferably positioned outside a symmetry axis, or offset from the centre of the carrier 2. This simplifies determination of orientation of the blocks on the captured image. A use of a square form for defining a shape of the marker 7 simplifies determining whether a given area of the image of the carrier 2 is a marker or not.

Figure 4:
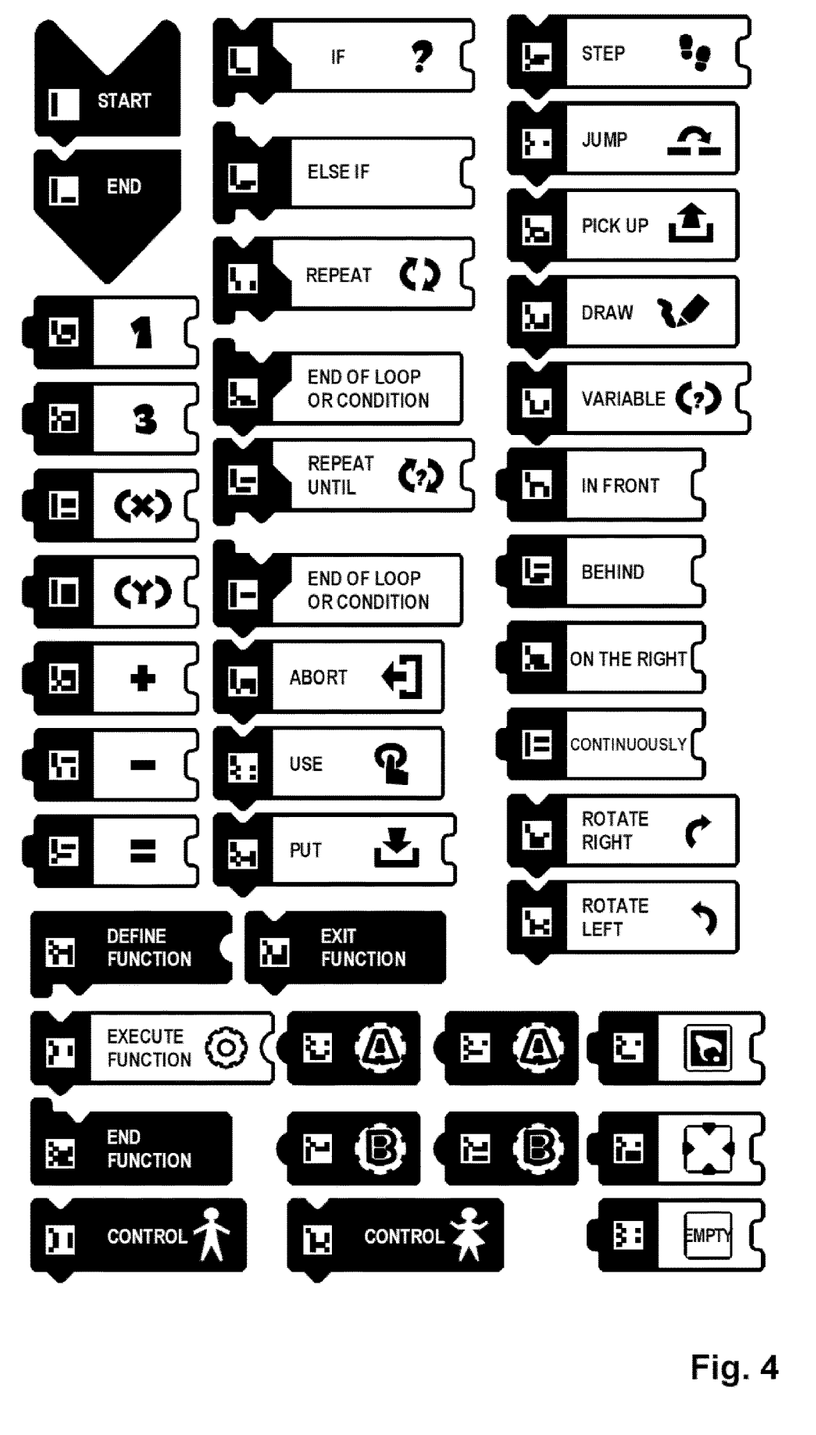
FIG. 4 presents examples of physical carriers of information in a form of a flat, cardboard block or a puzzle piece.

Examples of types physical carriers of information 2 are presented in FIG. 4 of the drawing. The use may be provided with a plurality of carriers 2 of each type, to enable constructing an algorithm that comprises a plurality of steps or values of the same type. For example, a set of physical carriers of information 2 may comprise the following blocks (with the number of pieces of carriers of the particular type indicated in parenthesis):

Blocks representing boundaries of the algorithm: START and END of a program;

Blocks representing a command: STEP (6 pieces), ROTATION RIGHT (4 pieces), ROTATION LEFT (4 pieces), PICK UP (4 pieces), PUT (3 pieces), USE (4 pieces), DRAW (2 pieces), JUMP (3 pieces); CONTINUOUSLY (3 pieces);

Blocks defining a variable: VARIABLE (3 pieces);

Blocks defining a numerical value: ONE (5 pieces), TWO (4 pieces), THREE (3 pieces), FOUR (3 pieces), FIVE (2 pieces), SIX (2 pieces), SEVEN 2 pieces), EIGHT (2 pieces), NINE (2 pieces), ZERO (2 pieces);

Blocks defining a variable name: X (6 pieces), Y (4 pieces),

Blocks defining an operator: EQUALS (3 pieces), MINUS (3 pieces), PLUS (2 pieces), Blocks defining a relative position: HERE (3 pieces), IN FRONT (3 pieces), ON THE RIGHT (2 pieces), ON THE LEFT (2 pieces), BEHIND (2 pieces), Blocks defining an object: EMPTY (3 pieces), OBSTACLE (3 pieces), HILL (3 pieces), ENVELOPE A (3 pieces), ENVELOPE B (3 pieces), AN OBJECT TO PICK UP (3 pieces), ACTION AREA (3 pieces);

Blocks defining a command executor: CONTROL (CHARACTER A) (3 pieces), CONTROL (CHARACTER B) (3 pieces), CONTROL (CHARACTER C) (3 pieces), CONTROL (CHARACTER D) (2 pieces);

Blocks defining a function: DEFINE A FUNCTION (3 pieces), END OF FUNCTION (3 pieces), EXIT FUNCTION (3 pieces), EXECUTE FUNCTION (5 pieces), A (5 pieces), B (5 pieces), C (5 pieces).

Figure 1:
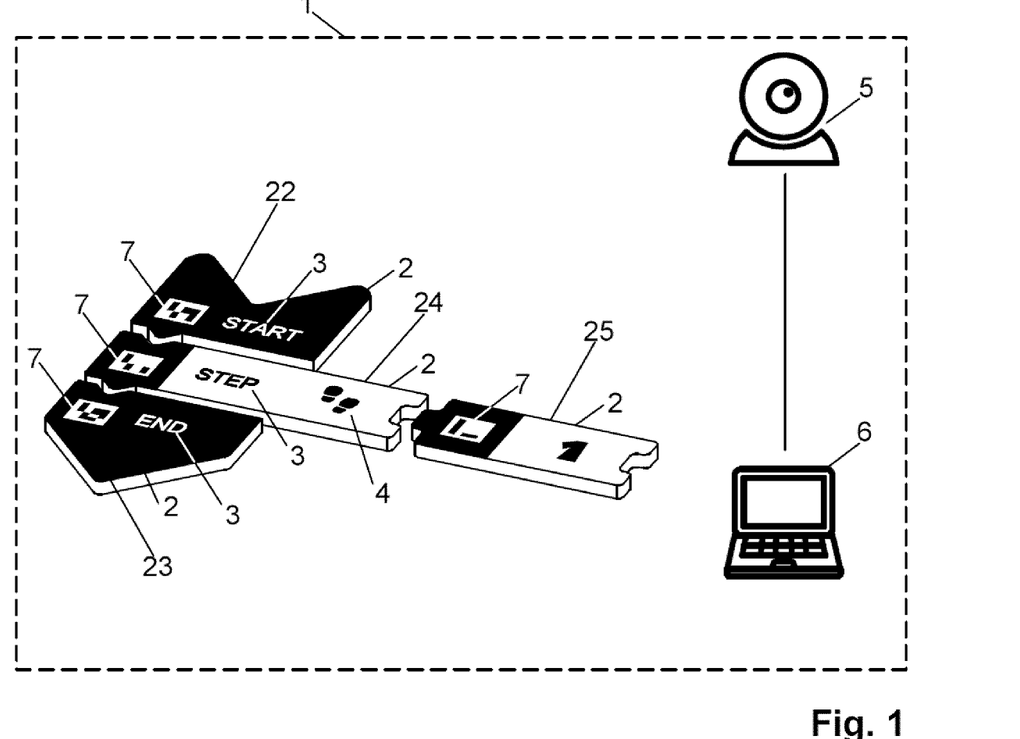
FIG. 1 presents a block diagram of a device according to the present invention.

The device according to the present invention, in a preferred embodiment, comprises an image capture device 5 configured to capture a digital image as well as a computer device 6, which is configured to process the digital image obtained from the image capture device 5. These devices can be integrated in a form of a tablet 11 comprising an operating system and a camera in its back panel. Other devices can be used as well, such as a smartphone, a notebook computer, etc.

In order to use the system, the user may use any kind of a standard type of tablet 11 with a camera, and install thereon additional software application 60 comprising a programming environment, in which to particular physical carriers of information 2 there are assigned elements of a computer program.

Figure 9:
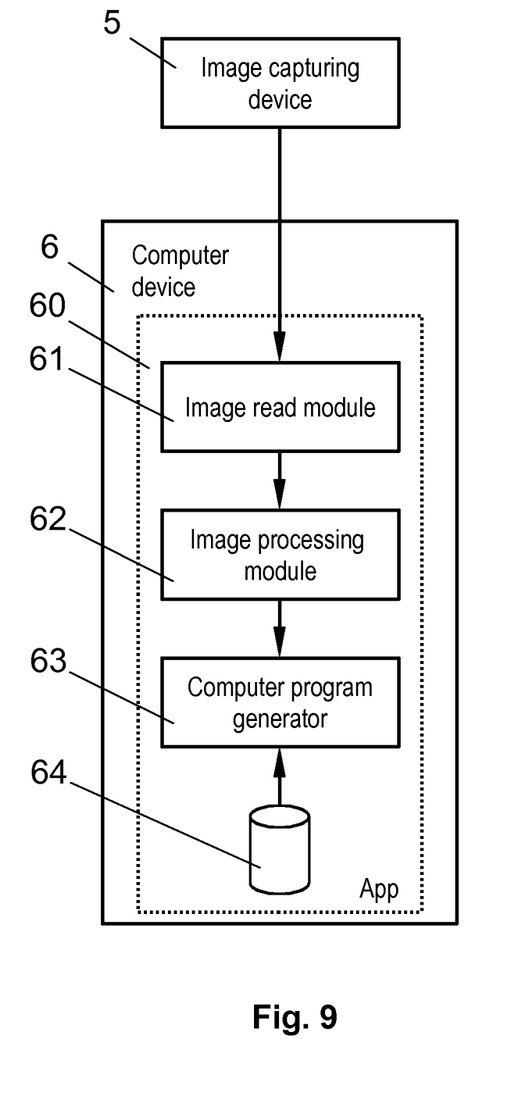
FIG. 9 presents a schematic diagram of a functional structure of the device.

The software application (App) 60 installed on the computer device 6 may comprise the following modules:

an image capture module 61 configured to read the digital image captured by the camera 5;

an image processing module 62 configured to process the digital image to recognize the carriers 2 on the image and determine the arrangement of the carriers 2 with respect to each other, in particular by recognizing the markers on the carriers;

a computer program generator 63 configured to convert the extracted arrangement of markers 7 to a computer program structure, depending on a data container 64 that associates markers with computer program elements.

The data container may have a form of an array of ordered identifiers of the physical carriers of information, based on a structure associating identified markers with selected actions.

The software application may be downloaded by the user from the Internet of can be offered on a computer readable medium together with the remaining elements of the system according to the present invention.

Figure 3:
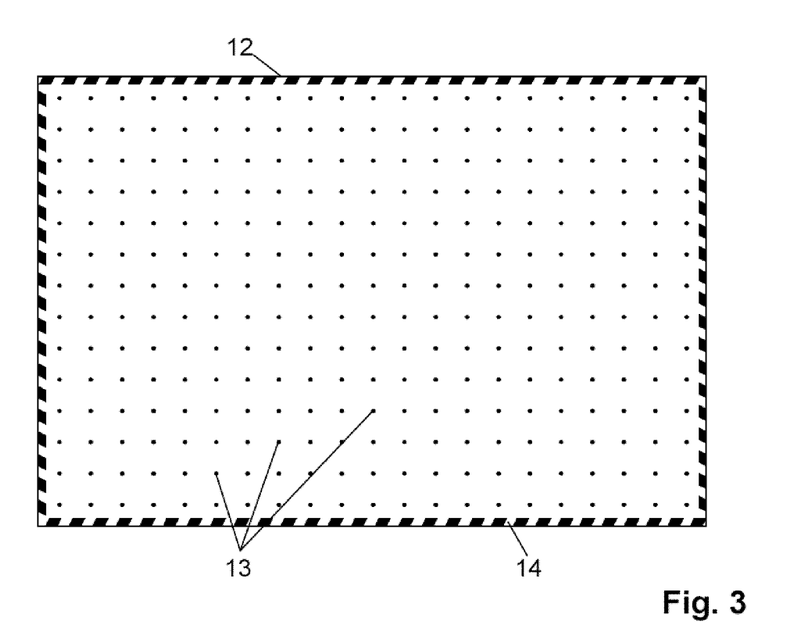
FIG. 3 presents construction details of a cardboard board determining workspace, on which there are positioned the physical carriers of information.

The physical carriers of information 2 can be positioned on a board 12, made for example of cardboard, which defines a working space. The board 12 may form one of the elements of the set 1 offered for sale to a user.

The board 12 may have a grid of points printed thereon, as well as a contrasting outline 14. The points facilitate positioning and ordering of the carriers 2. Furthermore the points and/or the outline 14 facilitate image recognition of the digital image captured by the camera 5, for example to correct perspective and scale the image.

A user creates an algorithm from available blocks by arranging the blocks, preferably on the board 12. The user is directed by the natural language description text 3 present on the available blocks as well as graphical symbols 4 present on the available blocks or instructions available in a user manual.

Each algorithm starts with a START block 22 and ends with an END block 23. After the START block 22, there are sequentially arranged along one axis, preferably vertically, instructions being parts of created algorithm 5.

Some of the blocks may have a possibility of adding blocks on their right side, for example for a STEP block 24 one may add a block denoting a number of steps 25.

Subsequently, a user, using the application 60 installed on the computer device 6, such as the tablet 11, executes an image capture (photo or video) process of blocks arranged on a plane. In order to capture the image, a user may hold the tablet 11 and directs its rear camera towards the plane, on which the blocks have been arranged.

The application 60 recognizes and identifies the markers 7 on the captured digital image. For example, the application may recognize an icon 15 of a green colour, displayed above the recognised marker 7. The display of the icon 15 of a green colour is effected on a display screen of the tablet 11 in real time, even before taking the actual picture or during recording of a video sequence.

Figure 5:
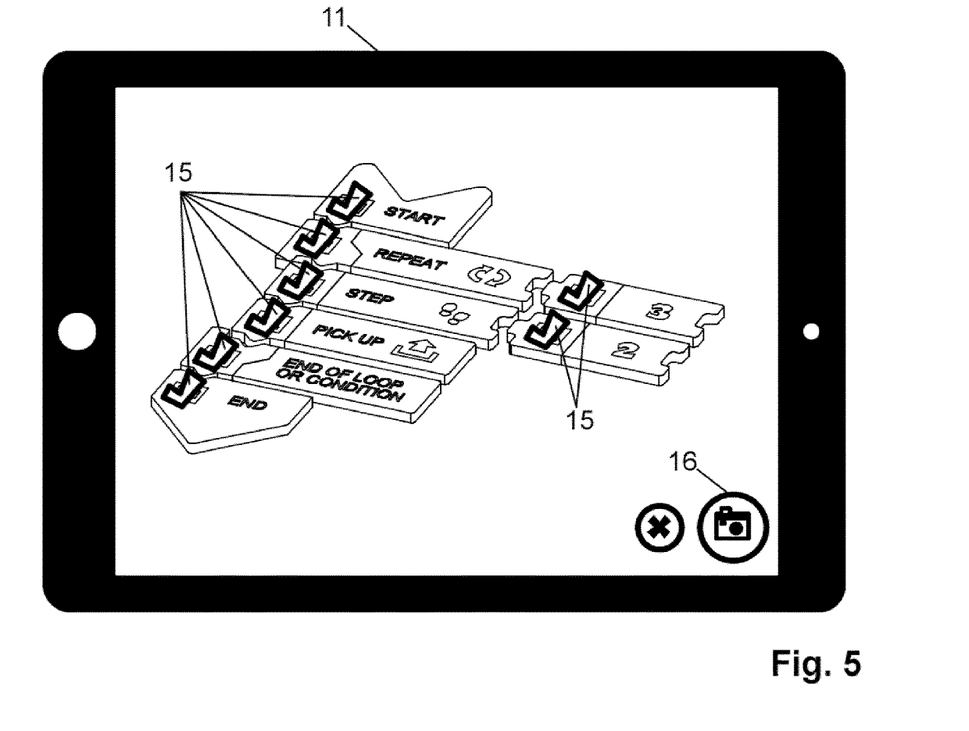
FIG. 5 presents a computer display screen for learning of programming, which may be used with a device according to the present invention as well as elements of a graphical interface presented before scanning of the markers.

FIG. 5 presents a computer display screen for learning of programming, which may be used with a device according to the present invention as well as elements of a graphical interface presented before scanning of the markers 7.

A user executes scanning of the blocks and their recognition by selecting a scanning icon 16, which in this embodiment resembles a photographic camera.

Figure 6:
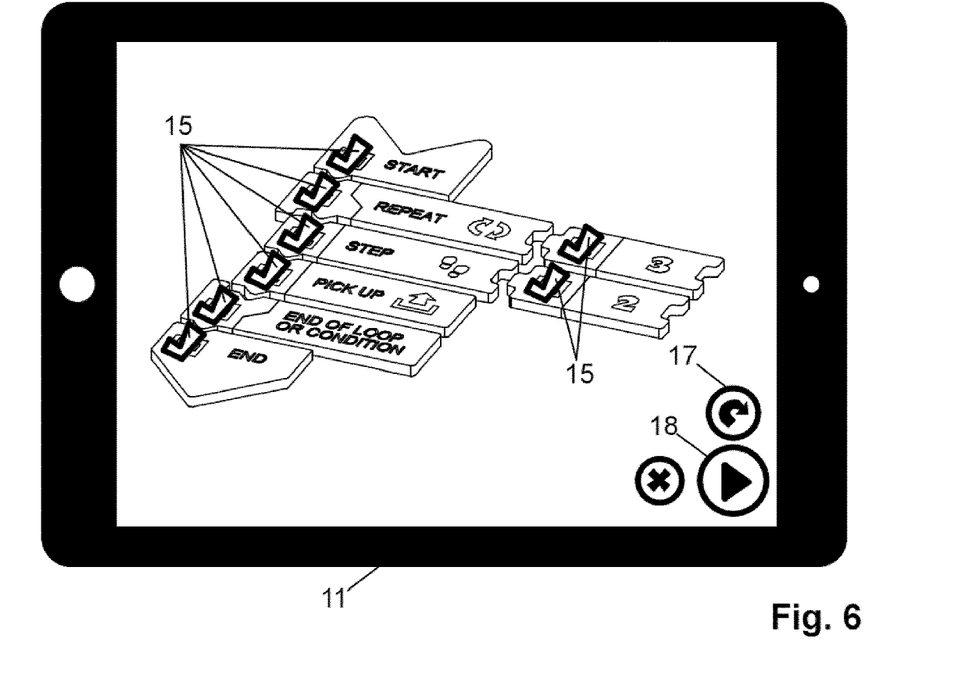
FIG. 6 presents a computer display screen for learning of programming, which may be used with a device according to the present invention as well as elements of a graphical interface presented after scanning of the markers.

FIG. 6 presents a computer display screen for learning of programming, which may be used with a device according to the present invention as well as elements of a graphical interface presented after scanning of the markers 7.

In case not all markers 7 have been recognised, a user may make another attempt at taking a photograph or a video sequence, by selecting a retry icon 17.

When the scanning has been successful, the application may execute the read computer program. A user preferably initiates the computer program by selecting a playback icon 18.

Simple programs, created by a user, may be used to control an educational computer game, in which in order to carry different tasks, a student (a user) shall program a character 19 moving on a display screen of the tablet 11, in such a manner so that the character finishes required tasks.

Figure 7:
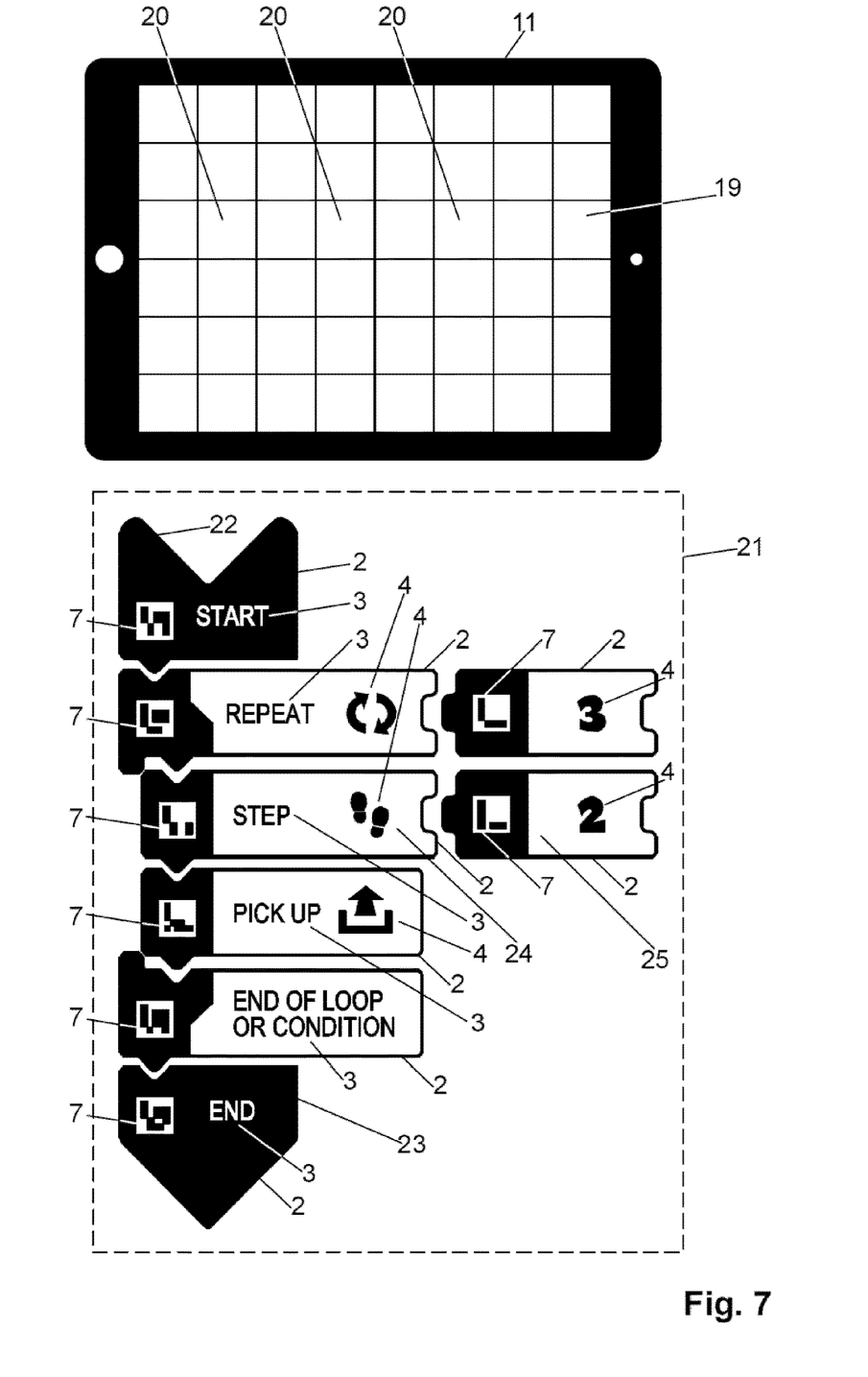
FIG. 7 presents an example of an arrangement of the physical carriers of information as well as a display screen of a computer game, which may be controlled with a computer program generated with the device according to the present invention.

FIG. 7 presents a screen of an educational computer game, in which a task of a player is to move a character 19 to stars 20, visible on the screen, in order to pick them up. In order to do this, a user shall create, form the available blocks being the physical carriers of information 2, an arrangement 21 presented in FIG. 7.

Figure 8:
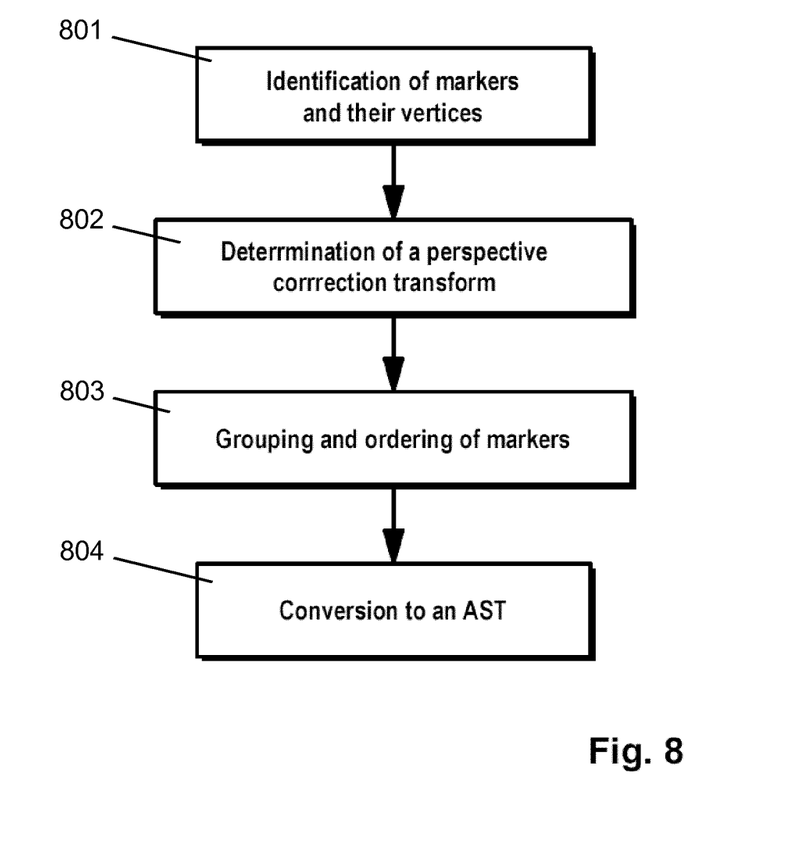
FIG. 8 presents a schematic diagram illustrating the method according to the present invention.

The method, for generating computer programs, according to the present invention, in an exemplary embodiment, comprises steps defined below. FIG. 8 presents a schematic diagram illustrating the method according to the present invention. The physical carriers of information 2, in a form of flat cardboard blocks described above, are arranged by a user on a plane, for example on the cardboard board 12.

Next, with a use of the image capturing device 5, which may be a rear camera of the tablet 11, a user records an arrangement of the physical carriers of information 2 on a plane.

Subsequently, an image captured by the image capturing device 5, in a form of a picture of preferably 1280 pixels by 960 pixels or a video sequence of the same frame size, is transferred to the computer device 6, which is the tablet 11.

Next, in the computer device 6, before creating a computer program, the markers 7 and their vertices are identified (using the image processing module 62). The identification of markers 7 is effected preferably with a use of a library called ArUco, preferably in version 1.3.0 or other similar software or hardware having the same capabilities.

Exemplary input data of this step of the procedure are presented in the following table:

| Identifier | vertices coordinates (x, y) |
| --- | --- |
| 5 | (788, 357), (836, 357), (838, 402), (789, 403) |
| 8 | (536, 362), (583, 360), (584, 405), (536, 407) |
| 10 | (176, 377), (223, 376), (220, 421), (173, 422) |
| 11 | (187, 585), (236, 584), (233, 633), (184, 634) |
| 17 | (206, 814), (257, 814), (254, 867), (202, 867) |
| 44 | (568, 473), (618, 472), (618, 519), (568, 520) |

The X axis is directed right while the Y axis is directed downwards. The (0, 0) coordinate point is preferably present at the top left corner of the image. An identifier is assigned to respective rectangular markers 7 of high contrast and thereby to respective physical carriers of information 2.

A set of identifiers, obtained as a result of computer vision processing, is not ordered. In order to allow further processing, the set needs to be ordered according to a sequence of blocks, on which the markers 7 are present.

The ordering stage has two sub-steps: during the first stage there is found a transform (perspective correction) (802) allowing to transform the input image such that it looks like as if being taken with a camera positioned parallel to the plane on which the blocks are arranged, the camera being rotated according to rotation of the blocks; and during a second stage, after application of the transform, coordinates of vertices are grouped into lines and ordered according to a sequence of their reading (803).

The first of the aforementioned stages is ordering of data such that it is possible to convert them into an algorithm. To this end there is required a determination of mutual positioning of the markers 7.

In order to do that, there is executed a transformation of the image, captured by the image capturing device 5, to remove perspective shift based on data of vertices of the markers 7. In order to define the perspective transform there are needed two sets of four points each, wherein: none three points of each set may be collinear and all four points of each set must be present on a single plane.

In an OpenCV programming library a get Perspective Transform may be used for that purpose. The obtained perspective transform allows to transform sets of points from one to another. Each of used markers 7 has four vertices, which may be used as one of such sets. Because it is known that each marker 7 is a square of a given size, another set may be generated as vertices of that square.

These two sets allow to determine a transform allowing for transforming an image of a marker 7 so that perspective distortion is removed.

The obtained transforms allow to obtain the same view on a given marker 7 irrespectively of a distance of the image capturing device 5 as well as its tilt and rotation angles.

In the described example, there are more than one marker 7 on the image. Because of inaccuracy in determining vertices coordinates, a transform determined for a given marker 7 may not be used for the full image, including the remaining markers 7. To this end there must be obtained a transform being a combination of all individual transforms of the individual markers 7.

Therefore, there is determined a matrix of distances between markers 7. These values need not be precise, because they will only be used to determine a sequence of joining of transforms—preferably, the errors should be smaller than the average marker size. A distance between two markers 7 is calculated as an average distance between the markers 7 after transforming the image using transforms obtained for each of the markers 7. The markers 7 are combined into greater groups according to an order set by increasing distances between them in a Spanning Tree.

During combining of the markers 7 into groups, there are determined subsequent, more precise transforms according to the procedure outlined below.

First there are created as many groups as there are detected markers 7. With each group there are associated two sets of points required to obtain a transom, as well as the transform. The first of the sets—a set of source points—comprises coordinates of vertices of markers 7 in the original image, while the second set—target points—comprises target coordinates after transforming the image for a given group.

At the beginning these are four vertices of a single marker 7 assigned to a given group as well as four vertices of a square of an arbitrary size. During combining of two groups there need to be combined the corresponding sets and there needs to be determined a new transform.

The sets of points may be combined directly, because they comprise coordinates of vertices in the same reference frame. A problem may arise when combining the sets of target points, because they are defined in different reference frames. Therefore, at first there needs to be determined a mutual displacement of these reference frames. It is calculated using a procedure described below.

The original coordinates of the markers 7 of both groups are transformed with a transform determined for one of the groups. In this reference frame there is determined a displacement between two nearest markers 7 belonging to different groups. This value is the aforementioned displacement of the reference frames.

In order to increase precision this displacement (vector) is calculated again using a transform of a second group. As a final result there is assumed a weighted average of the two vectors wherein the weights are given by the size of each group. After combining of the sets of points, a new transform is determined.

In the OpenCV library a function find Homography is used for that purpose. After combining of all groups, the obtained transform may be applied in transformation of the complete image.

In an image after the transformation, rows are set parallelly to the X axis therefore in respective rows, the markers 7 may be ordered with respect to their reading sequence according to an increasing X coordinate value.

Next, a table of associated markers' identifiers is transformed to an abstract syntax tree (AST) (804). On this basis, in the computer device 6, there is created a computer program from the table of ordered values of identifiers of physical carriers of information 2.

The invention claimed is:

1. A system for generating computer programs, the system comprising:
   a plurality of physical carriers of information comprising thereon a rectangular contrasting marker associated with an element of the computer program and at least one of: a description text and a graphical symbol, wherein the carriers are configured to form the computer program when the carriers are sequentially arranged along a first axis whereas at least one carrier is configured to receive another carrier of information on its right side, along a second axis perpendicular to the first axis;
   an image capturing device configured to capture a digital image of an arrangement of the carriers forming the computer program; and
   a computer device, comprising a display screen and configured to:
   process the image,
   recognize the carriers on the image,
   determine the arrangement of the carriers with respect to each other,
   superimpose on the image a graphical icon above the marker of each recognized carrier and output the combined digital image, and
   convert the determined arrangement to the computer program.

2. The system according to claim 1, wherein the element of the computer program is one of: a value, a variable, a function, a part of a function, an operator, a table, a programming library, an object, a class, a method, a command and an instruction.

3. The system according to claim 1, wherein the marker comprises elements that form a matrix barcode.

4. The system according to claim 1, wherein the carriers comprise at least one connecting zone, extending on a perimeter of the carrier, in a form of a recess or a protrusion.

5. The system according to claim 1, wherein the computer device and the image capturing device are integrated in a single device.

6. The system according to claim 1 wherein the marker has a shape of a square.

7. The system according to claim 1 wherein the marker is offset from a centre of the carrier.

8. A method for generating computer programs, comprising:
- providing a plurality of physical carriers of information comprising thereon a rectangular contrasting marker associated with an element of the computer program and at least one of: a description text and a graphical symbol, wherein the carriers are configured to form the computer program when the carriers are sequentially arranged along a first axis whereas at least one carrier is configured to receive another carrier on its right side, along a second axis perpendicular to the first axis;
- providing an image capturing device;
- providing a computer device having a display screen;
- capturing a digital image of an arrangement of the carriers forming the computer program by the image capturing device;
- transferring the captured image to the computer device; and
- in the computer device:
  - processing the image,
  - recognizing the carriers on the image by identifying the markers and coordinates of marker vertices on the image,
  - transforming the image by correcting the image perspective based on data representing the coordinates of vertices of the identified markers,
  - determining the arrangement of the carriers with respect to each other,
  - superimposing on the image a graphical icon above the marker of each recognized carrier,
  - outputting the combined image,
  - accepting a confirmation to proceed, and
  - converting the determined arrangement to the computer program.

9. The method according to claim 8, wherein the marker has a shape of a square.

10. The method according to claim 8, wherein the marker is offset from the centre of the carrier.

* * * * *